United States Patent [19]
Tanner

[11] 3,848,880
[45] Nov. 19, 1974

[54] FLUID SEAL

[75] Inventor: Charles L. Tanner, Los Angeles, Calif.

[73] Assignee: Tanner Engineering Company, Los Angeles, Calif.

[22] Filed: June 9, 1972

[21] Appl. No.: 261,267

[52] U.S. Cl................ 277/176, 277/177, 277/188, 277/231
[51] Int. Cl................................................ F16j 9/00
[58] Field of Search .......... 277/176, 177, 165, 188, 277/231, 227, 211

[56] References Cited
UNITED STATES PATENTS

| | | | |
|---|---|---|---|
| 2,914,369 | 11/1959 | Hayman | 277/177 UX |
| 2,965,421 | 12/1960 | Zindler | 277/188 |
| 3,149,848 | 9/1964 | Galloway | 277/165 |
| 3,172,670 | 3/1965 | Pras | 277/176 X |

FOREIGN PATENTS OR APPLICATIONS

1,900,860  9/1964  Germany

*Primary Examiner*—Samuel B. Rothberg
*Attorney, Agent, or Firm*—Herzig & Walsh Incorporated

[57] ABSTRACT

Disclosed herein is a fluid pressure seal useful over a wide range of fluid pressures. The seal is adapted for use between two either relatively moving or static members one of which has an annular sealing groove formed in the surface thereof adjacent the other member. A continuous annular boot fabricated from a relatively hard material and of generally U shape in cross section is positionable in the sealing groove with its body portion adjacent the low pressure side of the groove and a pair of generally parallel spaced leg portions positionable respectively adjacent the base of the groove and the other member with little or no initial interference. A second coaxial continuous annular ring fabricated from a resilient flowable material, such as rubber, has a first body portion positioned between the legs of the boot and a second body portion extending beyond the boot legs in the high fluid pressure direction. The second body portion has a width dimension in its free state greater than the distance between the boot legs and is adapted to be in a state of compression after installation in the sealing groove to effect a seal at low fluid pressure.

9 Claims, 7 Drawing Figures

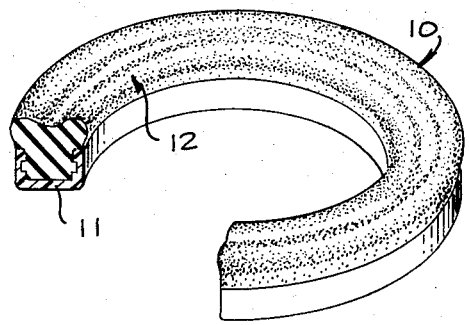
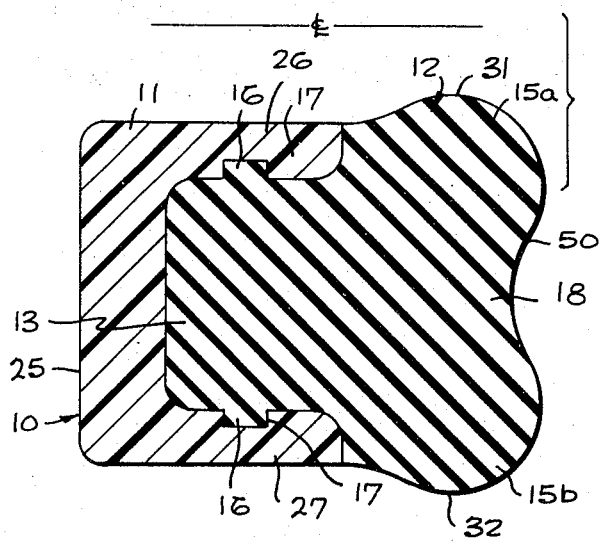
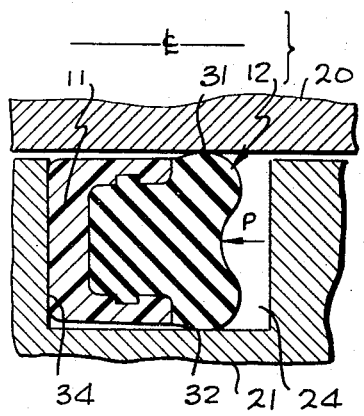
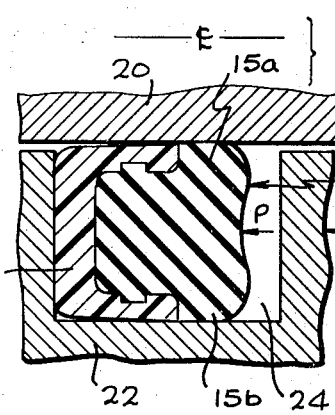
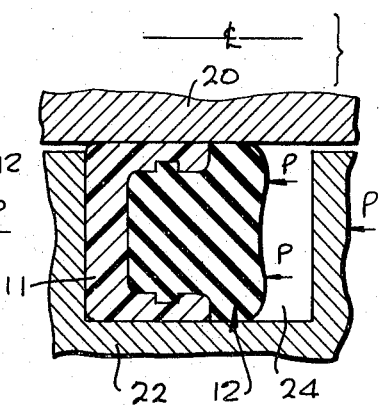
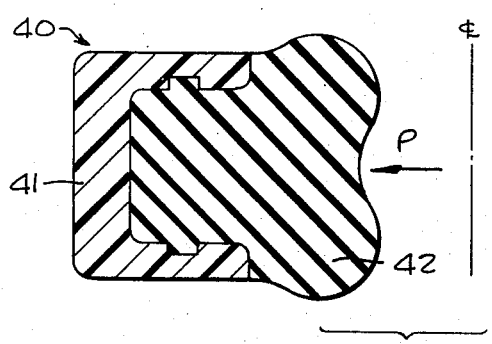
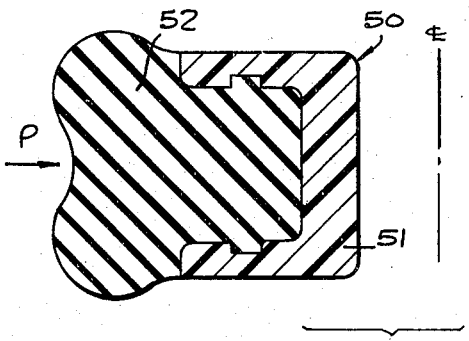

FLUID SEAL

BACKGROUND OF THE INVENTION

1. Field of the Invention

This invention relates to sealing devices for effecting a fluid pressure seal between both static and relatively reciprocating or rotating elements and, more particularly, to sealing devices providing improved performance in both high and low fluid pressure systems.

2. Description of the Prior Art

The most common fluid seal perhaps is the O-ring. The O-ring is a continuous ring of circular cross section and is typically fabricated from a resilient flowable material such as natural or synthetic rubber. It is adapted to be positioned in an annular sealing groove formed in one of a pair of opposed static or relatively reciprocating or rotating surfaces. At least some preloading (as by an interference fit) is normally required to effect a seal at low fluid pressures.

Rubber O-rings have achieved prominence primarily because of their simplicity, low initial cost and their ability to effect a generally satisfactory seal with substantially less total force against the sealing surface than required by sealing rings fabricated from harder materials. As is well known, however, rubber O-rings have a relatively high coefficient of friction and, due to inherent material characteristics, are generally unsuited to high pressure applications.

Various structural modifications have been developed to improve the high pressure performance characteristics of seals fabricated from resilient materials. These improvements have involved varying the cross-sectional configuration of the sealing ring. One such approach is described in U.S. Pat. No. 2,873,132 to Charles L. Tanner, the inventor herein. In that patent an X-ring is disclosed of generally square cross-sectional configuration providing a seal having superior (high pressure) performance characteristics over a relatively wide pressure range. Seal rings fabricated from resilient flowable material such as rubber are inherently pressure limited, however, due to well-known high pressure extrusion effects which are unavoidable in known resilient materials.

To overcome these limitations sealing rings fabricated from harder materials such as polyurethane and polytetrafluorethylene resin (a plastic material commonly known under the tradename "Teflon") have been utilized. These harder materials retain stable dimensional characteristics over relatively wider pressure ranges than the rubber materials and are thus more adapted to high pressure systems.

In order to create an adequate seal (with the harder materials) at low pressure, however, it is necessary to provide a substantially higher initial loading than that required by the softer materials. The high initial loading is frequently achieved by use of auxiliary rubber or metal spring configurations which press the sealing ring against the surfaces to be sealed with substantial force. Such seals are more complicated and have a considerably higher initial cost than the simple rubber O-rings. Further, the harder materials are relatively stiff and resist extrusion. They restore to their original shape only slowly after distorting forces have been removed. These seals thereby tend to leak at low fluid pressures. The requirement for high effective seal preloads (and resultant high friction) at low fluid pressures limits the use of these seals in devices, for example, where the loading on a hydraulic device is used to measure applied forces. In this situation the required high seal preloads limits overall equipment sensitivity.

Seals have been developed which attempt to take advantage of the most desirable properties of both the soft and the hard materials by utilizing composite seal structures. These seals typically employ a "Teflon" (or other hard material) ring or boot (constituting the bearing member) in the top portion of the sealing groove. The boot is backed by a rubber ring such as an O-ring which is compressed between the hard boot and the bottom of the sealing groove. This achieves the required initial loading on the boot. Such composite seal structures utilizing boots of various configurations and variously configured backup rings are described in U.S. Pat. Nos. Re24,440, 2,968,510 and 3,418,001. These U.S. patents constitute the closest art of which applicant is aware and each has apparent disadvantages which the instant invention is designed to overcome.

Some of the difficulties encountered are the very same as those already mentioned in the above discussion. Thus the composite seals as described in Pat. Nos. Re24,440, 2,968,501 and 3,418,001 may all be characterized as including a first sealing ring or boot which is fabricated from "Teflon" or other hard material. The boot is used to create the seal between relatively moving parts. A second ring of resilient flowable material is provided to seal both the base of the groove and the points of engagement between the first and second rings. Thus, as with an all-Teflon seal, greater loading of the "Teflon" boot is required at low fluid pressure than would be required by an all-rubber seal. In addition to these complications there are other problems associated with the high pressure "cocking" characteristics of the "Teflon" boots. Still further problems are associated with the high pressure limitations of the resilient flowable material utilized in the backup rings. Some of these problems are discussed, for example, in the above referenced U.S Pat. No. 3,418,001.

SUMMARY OF THE INVENTION

In accordance with the present invention a novel composite seal structure is disclosed which overcomes the above and other disadvantages of the prior art seals while providing a structurally simple, inexpensive seal operable at low, intermediate and high fluid pressures.

The seal of the present invention is adapted for use between two members one of which has an annular sealing groove formed at a surface thereof adjacent the other member. A first continuous annular sealing ring is provided. The first sealing ring is substantially U-shaped in cross section and is preferably fabricated from a relatively hard material such as "Teflon" or polyurethane. The first ring has a body portion adapted to abut the low pressure side of the sealing groove and a pair of substantially parallel, spaced leg portions. The leg portions are spaced so that they are respectively immediately adjacent the base of the groove and the other member preferably with little or no initial interference.

A second continuous annular sealing ring fabricated from a resilient flowable material such as rubber is provided. The second sealing ring has a first body portion adapted to fit between and engage the spaced legs of the first sealing ring. The second sealing ring has a second body portion which extends beyond the first ring's legs in the high fluid pressure direction. The second body portion has a cross section in its free form which is slightly greater than the space between the base of the groove and the second member. Thus, when the ring is installed in the groove, the second body portion contacts both the base of the groove and the other member. The resilient material thus effects a seal at the sealing surfaces with minimum force against such surfaces. In a preferred form the second body member has a pair of convexly shaped lobe projections connected by a concavely shaped intermediate portion.

At low pressure, therefore, sealing is effected by a relatively small area at the extremities of the lobe projections. As the fluid pressure increases the leg portions of the first sealing ring are forced into sealing engagement with the base of the groove and the surface of the second member. The first ring thus assures an effective seal at high pressures. The hard material from which the first ring is fabricated resists distortion at high pressure. The composite seal ring described thus exhibits the beneficial characteristics both of rings fabricated from a resilient flowable material (at low pressure) and those fabricated from relatively hard materials (at high pressure).

The novel seal of the present invention may be used between relatively reciprocating members such as pistons and cylinders and piston rods and between relatively rotating members such as shafts and housings. They may also be used as static seals where there is no relative motion between the two members.

These and other features and attendant advantages of the present invention will become more apparent from the detailed specification which follows having reference to the accompanying figures in which preferred embodiments are shown and described and wherein:

BRIEF DESCRIPTION OF THE DRAWINGS

FIG. 1 is a perspective view of one embodiment of a radial seal constructed in accordance with the principles of the present invention with a portion thereof broken away to show the seal in section;

FIG. 2 is an enlarged cross-sectional view of the sealing ring shown in FIG. 1 with a center line indicating the axis of the seal;

FIG. 3 is a fragmentary vertical sectional view of the radial seal of FIG. 1 shown after installation in a sealing groove (at low fluid pressure) and adapted to seal between two relatively reciprocating or rotating surfaces;

FIG. 4 is a fragmentary vertical sectional view of the embodiment shown in FIG. 3 shown under intermediate fluid pressure conditions;

FIG. 5 is a fragmentary vertical sectional view of the embodiment shown in FIG. 3 shown under relatively high fluid pressure conditions;

FIG. 6 is an enlarged sectional view of an inside face seal constructed in accordance with the principles of the present invention with a center line indicating the axis of the seal;

FIG. 7 is an enlarged sectional view of an outside face seal constructed in accordance with the principles of the present invention with a center line indicating the axis of the seal.

DETAILED DESCRIPTION OF THE PREFERRED EMBODIMENTS

Referring now to FIG. 1 there is shown in perspective an exemplary embodiment of a radial seal 10 constructed in accordance with the principles of the present invention. As shown radial seal 10 comprises a continuous annular ring or boot 11 and a second concentric continuous annular ring 12 integrally engaged with boot 11. Ring 11 is preferably fabricated from a relatively hard material such as "Teflon" or polyurethane. Ring 12 is preferably fabricated from a resilient flowable material such as natural or synthetic rubber.

Referring now to FIG. 2 a cross-sectional view of the radial seal of FIG. 1 is shown in enlarged form to reveal greater detail. As shown boot 11 is generally U-shaped in cross-sectional configuration. It has a radially extending body portion 25 and a pair of radially spaced, substantially parallel, axially extending leg portions 26 and 27. Legs 26 and 27 are preferably spaced so that when installed in a sealing groove their exterior surfaces respectively abut the base of the groove and the opposed member preferably with little or no interference (as shown in FIG. 3). The interior portion of legs 26 and 27 are provided with a pair of circumferential grooves 17.

Ring 12 has a first body portion 13 and a second integral body portion 18. Body portion 13 is configured to fit between and be retained by the legs of boot 11. To aid in the retention of ring 12 by boot 11 body portion 13 is provided with a pair of radially extending circumferential ears 16. Ears 16 are configured to be inserted in grooves 17.

Ring 12 has a second body portion 18 which, as shown, is positioned axially spaced from boot 11. The configuration of the second body portion 18 is characterized by extensions 15a and 15b. Extensions 15a and 15b define a maximum radial cross section which in their free state is greater than the radial cross section of boot 11. Put in other words, the radial distance between points 31 and 32 is greater than the radial distance between the outer surface of legs 26 and 27.

In the preferred embodiment shown in FIG. 2 extensions 15a and 15b define convexly shaped lobed corner portions separated by a concavely shaped intermediate portion 50. Although many other configurations may be utilized the most desirable configuration is that shown and described in U.S. Pat. No. 2,873,132 issued to the inventor herein.

Referring now to FIG. 3 the radial seal illustrated in FIGS. 1 and 2 is shown positioned in a sealing groove 24 so as to effect a seal between opposed members 20 and 21. Members 20 and 21 may be relatively rotating members such as a shaft in a housing or relatively reciprocating members such as a piston and cylinder or piston rod and cylinder head, for example. The view shown in FIG. 3 may be considered as representing the condition of seal 10 at relatively low fluid pressure. The high pressure direction is indicated in all figures by an appropriately labeled arrow. When installed body portion 25 of boot 11 is always adjacent the low pressure side of the sealing groove.

It will be appreciated that after installation the second body portion 18 of seal 12 will be in a state of slight compression. This is so since the radial cross section of body portion 18 in its free state is slightly greater than the distance between the base of groove 24 and the opposed surface of member 20. Points 31 and 32 therefore provide, at the working surface of member 20 and the base of groove 24, two annular lines of sealing contact. Sealing at low pressure is therefore achieved with low initial loading. It should be noted that boot 12 does not directly participate in the sealing function at low fluid pressures since legs 26 and 27 are spaced apart at most to provide a negligible interference fit.

Referring now to FIG. 4 the seal of FIG. 3 is illustrated under intermediate fluid pressure. Lobes 15a and 15b of annular ring 12 are distorted by the higher pressure so as to define a line contact in cross section at the sealing surfaces. This defines cylindrical sealing surfaces at the base of groove 24 and the working surface of member 20 respectively. The lobe portions in contact with the surfaces to be sealed are urged against those surfaces with a greater force than at low pressure to assure that a proper seal is effected. At the same time legs 26 and 27 of boot 11 are urged against the working surface of member 20 and the base of groove 24 to aid the sealing operation. This also prevents extrusion of the resilient material.

Referring now to FIG. 5 the seal of FIG. 4 is shown under high fluid pressure. Under high pressure boot 11 is forced to fully conform and square off against the low pressure side of groove 24. Legs 26 and 27 of boot 11 are urged into intimate sealing contact with the base of groove 24 and the working surface of member 20. The rubber sealing ring 12 is distorted until it fully conforms to fill the space between the legs of the boot. At high pressure the rubber ring 11 may be considered to function substantially as a fluid. The outer extremities of legs 26 and 27 of boot 11 provide cylindrical sealing surfaces which provide an effective seal at high pressure.

The seal structure disclosed may be generally described as having the following advantageous characteristics. At low fluid pressures sealing is effected by a small area of rubber in contact with the sealing surfaces. Although the loading per unit of contact between the rubber and sealing surfaces is sufficiently high to provide an effective seal, the total area in contact is small so that the total loading at low pressure is low. This is a characteristic of many types of all-rubber seals. As the fluid pressure increases the load induced by the fluid pressure is transferred to the "Teflon" boot. The pressure pushes the boot legs into increasingly intimate contact with the working surfaces. That is, as the fluid pressures increase the boot legs are pushed harder and harder against the working surface and the base of the sealing groove. Thus at high pressure the major portion of seal area in contact with the working surface is the low friction "Teflon" material. The seal thus exhibits both the most favorable low pressure characteristics of seals fabricated from soft material and high pressure characteristics of seals fabricated from hard materials. The high pressure limitations experienced by soft materials (resulting from the unavoidable extrusion effects) are obviated. The low pressure disadvantages experienced by hard materials (resulting from the requirement of providing a high preload to effect adequate sealing) is obviated.

Referring now to FIG. 6 an enlarged sectional view of an exemplary inside face seal constructed in accordance with the principles of the present invention is disclosed. The seal shown in free form in FIG. 6 is adapted for use between two static or relatively rotating members (not shown) one of which has an annular groove formed at a surface thereof adjacent the other member. The seal of FIG. 6 includes a first substantially U-shaped sealing ring or boot 41. The ring or boot 41 is preferably fabricated from a relatively hard material such as "Teflon." As shown boot 41 has a pair of axially spaced radially extending leg portions. The leg portions are spaced in a manner as described in connection with the seal of FIG. 1 so as to fit adjacent the base of the sealing groove and the opposed member with little or no initial interference.

A second coaxial annular sealing ring 42 is provided. Ring 42 has a first body portion adapted to engage and fit between the axially spaced legs of ring 41. Ring 42 has a second body portion which, as shown, includes a pair of lobe projections extending radially beyond the legs of boot 41 in the high pressure direction. The lobe extensions have an axial cross section (width) greater than that of boot 41 in the free state. As previously described in connection with the radial seals shown in FIGS. 1 through 5 the lobe extensions should have at least a slight interference fit when inserted in a groove. Ring 42 thus functions to effect sealing at low pressure. Apart from the structural modifications as above described the seal of FIG. 6 functions in a manner substantially similar to that described in connection with the radial seal embodiments shown in FIGS. 1 through 5 and need not be described in great detail. The major difference between the static seal embodiment is that the seal of FIG. 6 is adapted to seal between two members between which there is no relative motion. The direction of application of fluid pressure is indicated by the appropriately marked arrow. As in the prior embodiments the body portion of boot 41 is always positioned against the low pressure side of the sealing groove.

Referring now to FIG. 7 there is illustrated a cross-sectional view of an outside face seal adapted to effect a seal between two static or relatively rotating members (not shown) wherein the direction of applied pressure is indicated by the appropriately marked arrow. The seal of FIG. 7 is similar to that of FIG. 6 except that the resilient annular ring 52 forms the outer peripheral portion of the seal 50. As in previous embodiments the body portion of boot 51 is adapted to be positioned against the low pressure side of the sealing groove.

Improved seal structures have thus been described. The seals disclosed may be used to effect a seal both between relatively reciprocating or rotating members and between static members. Various modifications and changes to the detailed structure of the preferred embodiments as illustrated may be made without departing from the scope and spirit of the invention. For example, although convexly shaped lobes having the general structure described in U.S. Pat. No. 2,873,132 have been illustrated, other configurations for the extensions may be utilized. The only requirement is that the lobes extend beyond the boot legs in the high fluid pressure direction and have a cross-sectional dimension from extremity to extremity sufficient to be in slight compression when installed at low pressure. Accordingly, the scope of the present invention should be considered as being defined only by the appended claims.

I claim:

1. A fluid seal for sealing between two members having contiguous surfaces, one of which has an annular groove juxtaposed to the other surface, said seal comprising:

a first continuous annular sealing ring positioned in the groove and having a substantially U-shaped cross sectional configuration including a body portion positioned to abut the low pressure side of the groove and a pair of substantially parallel leg portions positioned repectively adjacent the base of the groove and the other surface with no initial interference; and a second coaxial continuous annular sealing ring having first and second body portions made of resilient flowable material positioned in said groove, said first body portion being positioned in engaging relationship between said first ring's leg portions, said second body portion having a greater radial width in the free state than the radial width of the first annular ring, said second body portion including projections extending in their free state sufficiently beyond said first ring's leg portions such that when installed said projections bear respectively against the other surface and the base of the groove and are exposed to the high pressure side of the groove, said legs normally being out of contact with the surfaces, said legs being constructed to spread progressively into full engagement with said surfaces upon said resilient flowable material of said second ring being forced by fluid pressure between said legs.

2. The fluid seal of claim 1 wherein said first seal ring is fabricated from a relatively stiff material.

3. The fluid seal of claim 2 wherein said second body portion defines a pair of convexly curved corner lobe projections connected by a concavely shaped intermediate portion.

4. The fluid seal of claim 3 wherein said first sealing ring's body portion is radially extending and said leg portions are radially spaced and axially extending.

5. The sealing device of claim 1 wherein said projecting portions define a pair of convexly curved corner lobes connected by a concavely shaped intermediate portion.

6. The sealing device of claim 5 wherein said first ring is fabricated from a relatively hard, stiff material and said second ring is fabricated from a relatively resilient flowable material.

7. A fluid seal for sealing between two members having contiguous surfaces, one of which has an annular groove juxtaposed to the other surface, said seal comprising:

a first continuous annular sealing ring adapted to be positioned in the groove and having a substantially U-shaped cross sectional configuration including a body portion adapted to be positioned to abut the low pressure side of the groove and a pair of substantially parallel leg portions spaced to be positioned respectively adjacent the base of the groove and the other surface with little or no initial interference; and a second coaxial continuous annular sealing ring having first and second body portions made of resilient flowable material adapted to be positioned in said groove, said first body portion being positioned in engaging relationship between said first ring's leg portions, said second body portion including projections extending in their free state sufficiently beyond said first ring's leg portions such that when installed said projections bear respectively against the other surface and the base of the groove, said rings being positioned so that the pressure urges the second ring toward the first whereby to cause both rings to deform towards surfaces to be sealed, said first seal ring being fabricated from a relatively stiff material, said second body portion defining a pair of convexly curved corner lobe projections connected by a concavely shaped intermediate portion, said first sealing ring's body portion being axially extended and said leg portions being axially spaced and radially extending.

8. A fluid seal for sealing between two members having contiguous surfaces, one of which has an annular groove juxtaposed to the other surface, said seal comprising:

a first continuous annular sealing ring adapted to be positioned in the groove and having a substantially U-shaped cross sectional configuration including a body portion adapted to be positioned to abut the low pressure side of the groove and a pair of substantially parallel leg portions spaced to be positioned respectively adjacent the base of the groove and the other surface with little or no initial interference; and a second coaxial continuous annular sealing ring having first and second body portions made of resilient flowable material adapted to be positioned in said groove, said first body portion being positioned in engaging relationship between said first ring's leg portions, said second body portion including projections extending in their free state sufficiently beyond said first ring's leg portions such that when installed said projections bear respectively against the other surface and the base of the groove, said rings being positioned so that the pressure urges the second ring toward the first whereby to cause both rings to deform towards surfaces to be sealed, said second body portion defining a pair of convexly curved corner lobe projections connected by a concavely shaped intermediate portion, each leg portion having an annular circumferential groove formed in the inner surface thereof, and said second ring's first body portion having a pair of annular circumferential ears adapted to fit within the leg grooves to aid in the retention of the second ring by the first ring.

9. A sealing device for use between two members, one of said members having an annular groove formed at the surface thereof adjacent the other member, said seal comprising:

a first annular sealing ring, said sealing ring being substantially U-shaped in cross section and having a radially extending body portion and a pair of radially spaced axially extending leg portions, said first ring being adapted to fit loosely within said annular groove; and a second annular sealing ring, said second ring having a first body portion adapted to engage and fit between the radially spaced legs of said first ring and a second body portion including a pair of projecting portions, said second body portion having a greater radial width in the free state than the radial width of the first annular ring, said projecting portions bearing in sealing relationship respectively against the bottom of the groove and the surface of the adjacent member when installed, said rings being positioned for pressure to urge the second ring toward the first and said extending leg portions being responsive to increasingly pressure to spread for sealingly engaging the bottom of the groove and said surface of the adjacent member, said projecting portions defining a pair of convexly curved corner lobes connected by a concavely shaped intermediate portion, said first ring being fabricated from a relatively hard, stiff material and said second ring being fabricated from a relatively resilient flowable material, each leg portion having an annular circumferential groove formed in the inner surface thereof and said second ring's first body portion having a pair of annular circumferential ears adapted to aid in the retention of the second ring by the first ring.

* * * * *